Sept. 15, 1931.    J. E. BODA    1,823,641
PLOW
Filed March 1, 1930    3 Sheets-Sheet 1
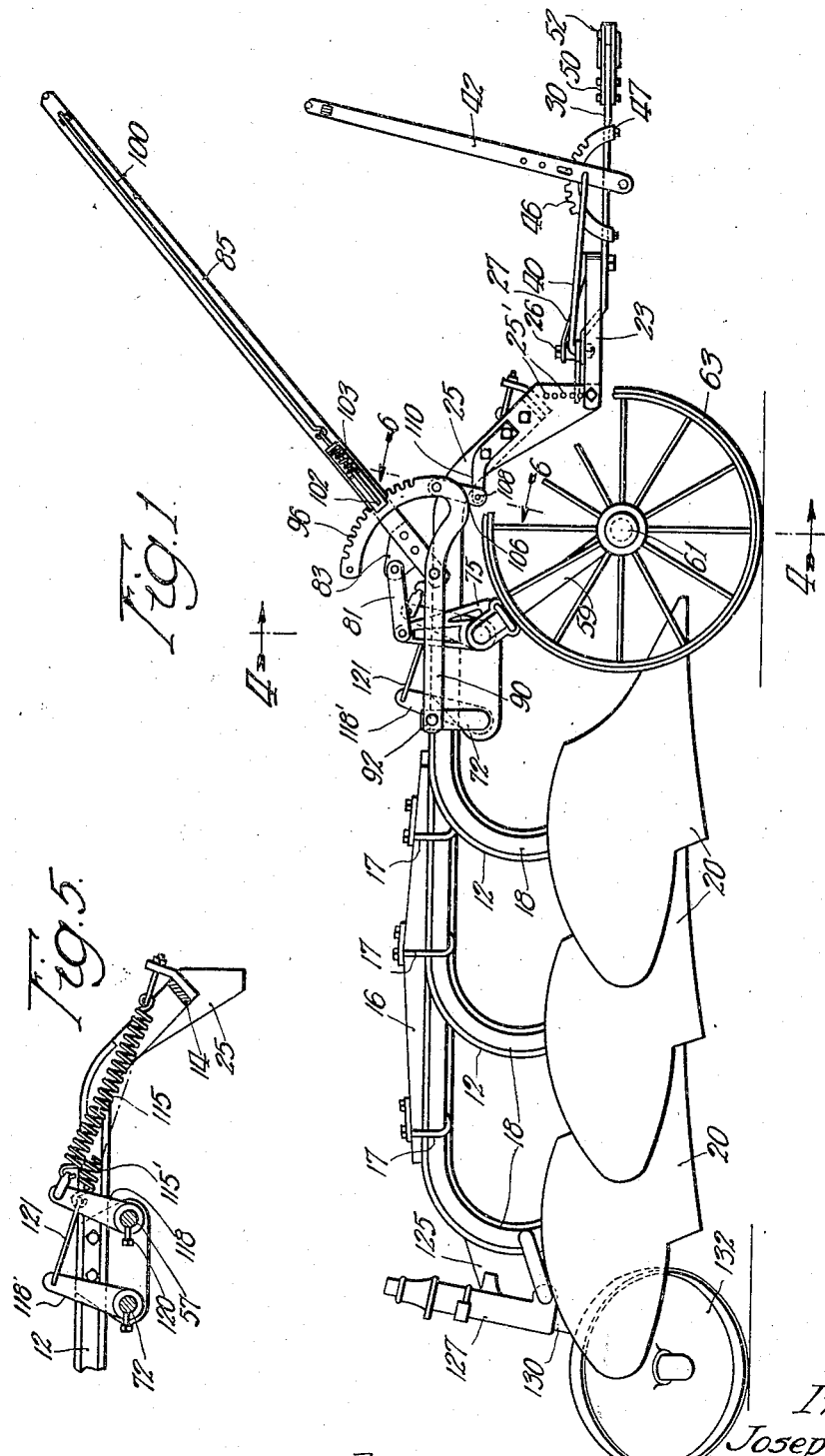

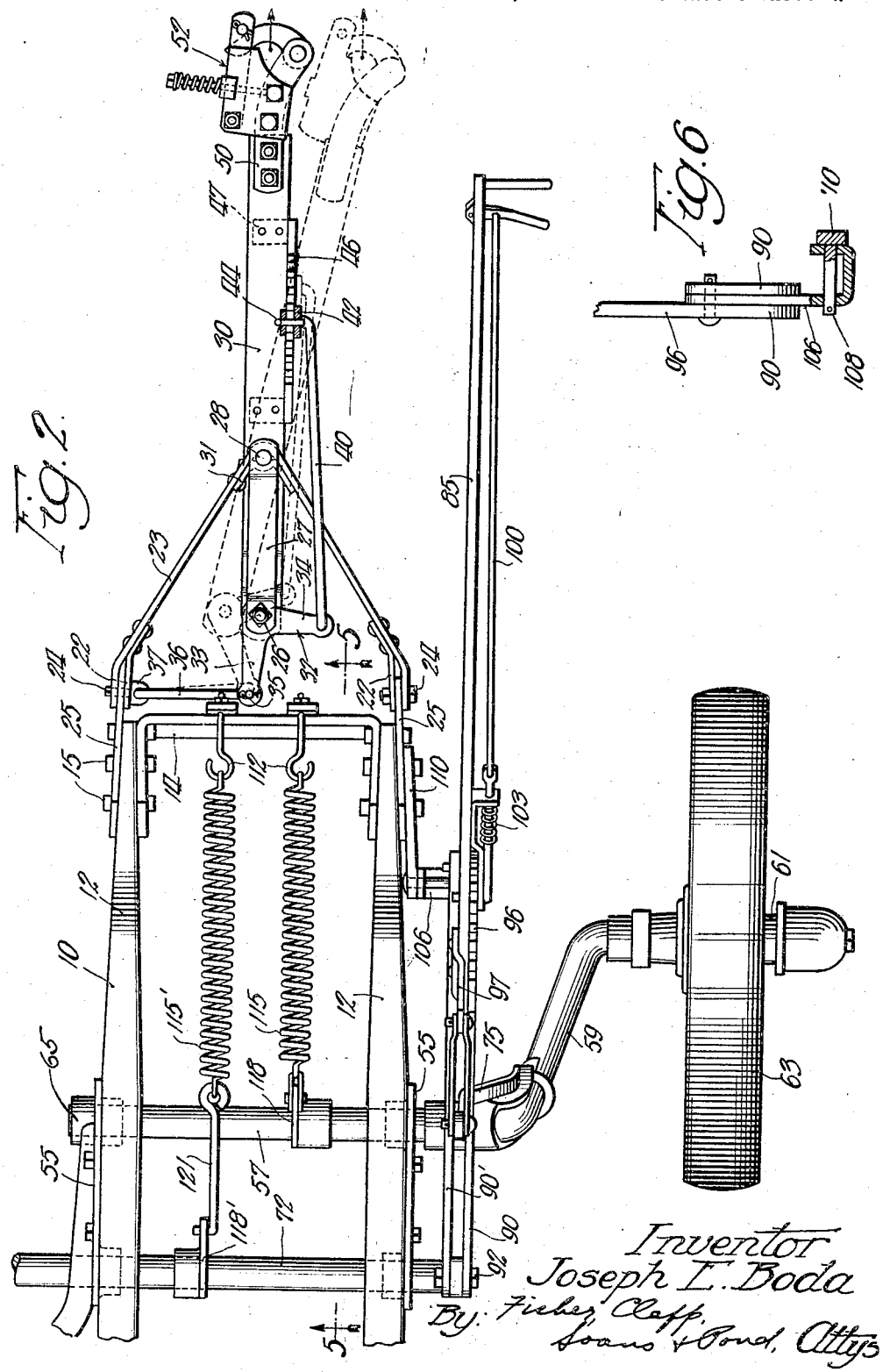

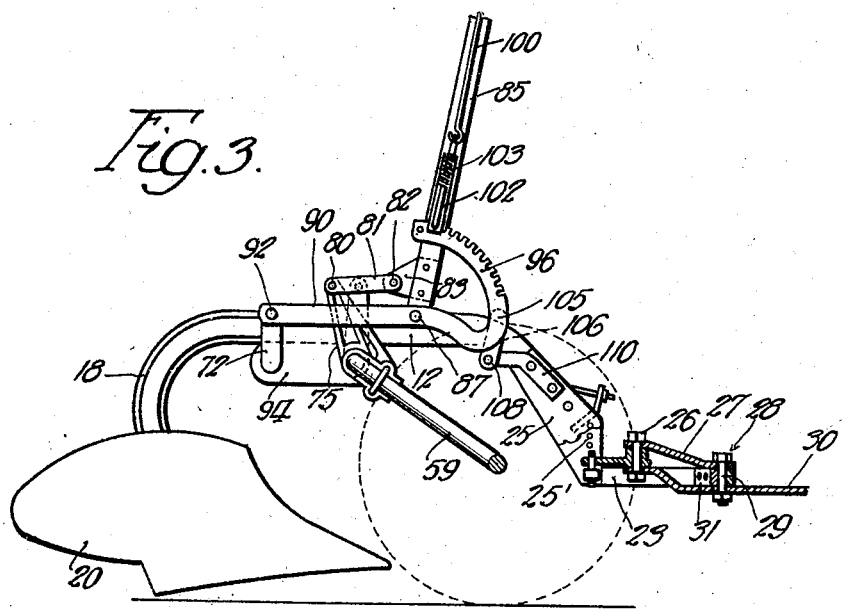
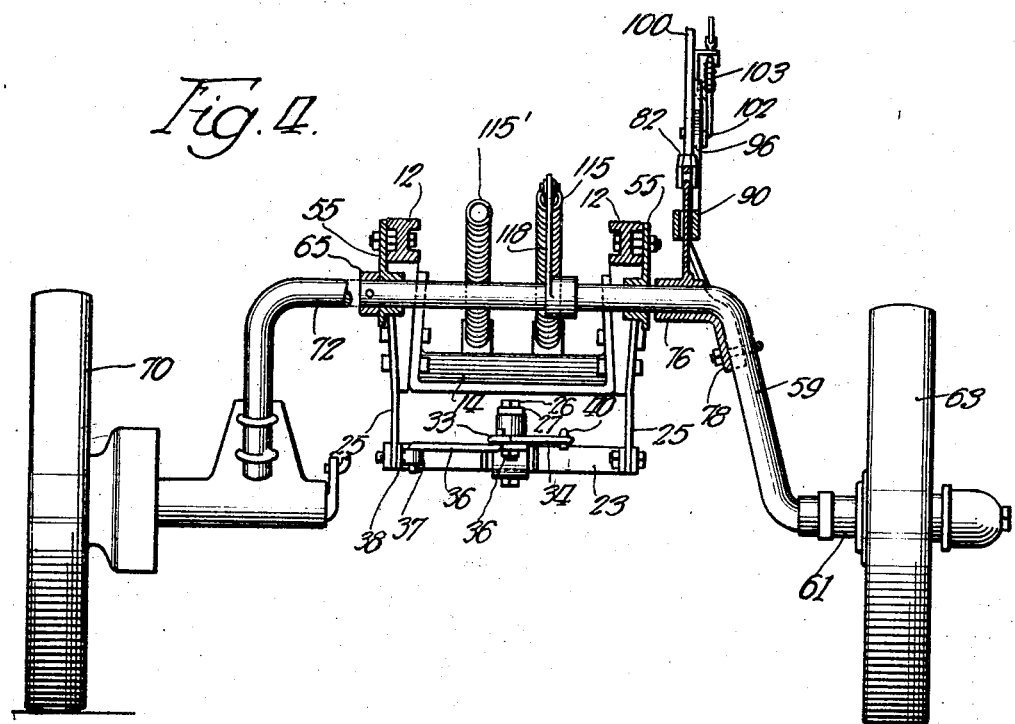

Patented Sept. 15, 1931

1,823,641

UNITED STATES PATENT OFFICE

JOSEPH E. BODA, OF ROCKFORD, ILLINOIS, ASSIGNOR TO J. I. CASE COMPANY, OF RACINE, WISCONSIN, A CORPORATION OF WISCONSIN

PLOW

Application filed March 1, 1930. Serial No. 432,318.

My invention relates generally to agricultural implements and has to do more particularly with plows.

One of the objects of my invention is to provide a plow having an adjustable hitch whereby the angle between the plow and the direction of travel of the tractor or other source of motivation for the plow may be adjusted. This is particularly desirable when plowing over sloping ground, in order to prevent the plow from slipping off from its normal direction of travel. Still another advantage of this feature is that the plow is thus enabled to avoid certain obstacles, such as tree stumps, overhanging branches, hedges, fences, or the like.

Still another object of my invention is to provide such a device with new and improved means for adjusting the elevation of the shares so as to vary the depth of the furrow which is being plowed and to allow for sloping ground.

Still another object is to provide such a device which will be simple and rugged in construction, inexpensive to fabricate and efficient in operation.

Various other objects and advantages will readily occur to those skilled in the art from the description herein given.

Referring now to the drawings forming part of this specification and illustrating a preferred embodiment of my invention:

Fig. 1 is a side elevational view of a device embodying my invention;

Fig. 2 is a top plan view of a portion of the same;

Fig. 3 is a side elevational view of the elevating mechanism in a different position from that shown in Fig. 1;

Fig. 4 is a sectional view taken substantially on the line 4—4 of Fig. 1;

Fig. 5 is a sectional view taken substantially on the line 5—5 of Fig. 2, and

Fig. 6 is a sectional view taken substantially on the line 6—6 of Fig. 1.

The preferred embodiment of the device comprises a frame 10 having side bars 12 and a front bar 14 connected to the side bars by means of bolts 15 or the like. The side bars 12 are braced at the rear of the plow by means of a diagonal bar 16 secured by means of U-shaped straps 17 or other suitable means (Fig. 1). The side bars 12 are curved downwardly as shown in Figures 1 and 3, being braced by means of tubular members 18 or the like, and carry adjacent their extremities a plurality of shares 20. It may be understood, of course, that any desired or convenient number of shares may be used.

Connected to the front end of the frame is a V-shaped yoke 23 bolted as at 24 to bars 25 projecting from the side members 12 and braced by angle members 22. As shown best in Figures 1 and 3, the extension bars 25 project forwardly and downwardly from the side bars 12 and are provided with a plurality of holes 25' adjacent their forward ends so as to permit of the adjustment of a hitch at various elevations. Pivotally connected to the yoke 23 at the vertex 28 thereof is a tongue 30, an angular brace 31 being provided at this point (Figure 2). Adjacent the rear extremity of the tongue 30 is secured a bell-crank lever indicated generally at 32 and comprising a rearwardly projecting arm 33 and a laterally projecting arm 34. This lever is pivoted by means of a pin 26 (Figure 3) to the tongue 30 and to a relatively short link 27 which is connected at its other end by means of a pin 29 to the tongue 30 from which it is spaced by the yoke 23. The arm 33 of the bell crank 32 is pivoted adjacent its extremity 35 to a link 36 which is pivotally secured to an ear 37 carried by one of the angles 22. The arm 34 of the bell-crank lever 32 is pivotally connected adjacent its extremity to a link 40 which in turn is pivotally secured adjacent its other end to a hand lever 42 (Figure 1). This lever may be of any well known or suitable type and may have a reciprocable rod (not shown) extending parallel and adjacent thereto, carrying adjacent its lower end a dog or pawl 44 which may be urged by means of a spring (not shown) into engagement with the teeth of an arcuate rack 46. This rack may be secured to the tongue 30, as by means of laterally projecting lugs 47 or the like.

It may be noted at this point that, as shown particularly in Figures 1 and 2, the hitch may be adjusted by means of the lever 42 by merely shifting the position of the lever about the arcuate rack 46, the lever being normally retained in position by means of the spring-urged dog 42. It will be noted from Figure 2 that the angle of the tongue may be varied about its pivot 28, the lever acting through the link 40 and bell-crank lever 32 to shift the tongue. By this means, the plow may be offset with respect to the tractor in order to clear certain obstructions such as overhanging trees or the like.

Carried by the tongue 30 adjacent its extremity by means of a bracket 50 is a device indicated generally at 52 for connecting the plow to a cable or the like. This connecting means may be of a well known design which is adapted to yield when the pull reaches a predetermined maximum, as when the plow encounters an obstruction, such as a rock, root, stump, or the like, in order that the cable may be released and injury to the plow may thus be avoided. Since this arrangement is well known, it is not considered necessary to describe the same in detail here.

Secured to the side frame members 12, as by means of bolts or the like, is a pair of bearing brackets 55 which serve rotatably to journal an axle 57. As shown best in Fig. 4, this axle is bent downwardly, preferably at an angle of less than ninety degrees, forming a depending portion 59, and thence horizontally to form a terminal portion 61 serving as a bearing for a front furrow wheel 63. A suitable thrust bearing 65 is provided for the end of the axle 57.

As shown in Figure 4, the plow may be provided with a land side wheel 70 which may be carried by an axle 72, which may be mounted similarly to the axle 57, or in any other convenient manner. However, since it will be understood that the details of construction with regard to the furrow wheel 63 may be applied to the land side wheel 70, such details will be described only for the former.

Arranged on the axle 57—59 is a bracket 75 having a sleeve portion 76 journaling the axle and a depending portion 78 (Figure 4) strapped to the depending portion 59 of the axle. Thus, as best shown in Figures 1 and 3, it will be seen that the bracket 75 is in the form of a bell-crank lever, the other end of which is pivoted as at 80 to a link 81, this link being pivoted at its other end, as at 82, to an ear 83 mounted on a lever 85. This lever, as best shown in Figures 1 and 3, is pivoted adjacent its lower extremity, as at 87, to a pair of bars 90, 90' (Figure 2) which are pivotally connected adjacent one of their extremities, as at 92, to the axle 72, which it will be noted is bent upwardly adjacent its extremity, passing through a bearing plate 94 which is secured to the frame by suitable means.

As shown best in Figures 1 and 3, the bar 90 is bent upwardly to provide an arcuate toothed rack 96, while the bar 90' terminates as at 97 where it is secured to the bar 90. A rod 100 is secured adjacent and parallel to the lever 85 and carries adjacent its lower end a dog 102 which is urged by means of a compression spring 103 into co-operative relation with the teeth of the rack 96. Pivotally secured to the bars 90 and 90', as at 105, is a link 106 (Figures 1 and 3) which is pivotally secured adjacent its other end as at 108 to a bracket 110 which is mounted on one of the bars 25.

Secured to the front bar 14 of the frame, as by means of hooks 112 or the like, is a pair of springs 115, 115'. The spring 115 is connected adjacent its other extremity to a lever 118 which is rigidly secured to the axle 57 as by means of a set screw 120 or the like. The spring 115' is similarly connected by means of a hook 121 to a lever 118' which is secured to the axle 72 in the manner just described for the lever 118.

Secured to the frame by any suitable means, as by a bracket 125, is a tubular post 127 journaling an axle 130 which carries a wheel 132. The wheel 132 is set askew to the vertical so as to react against the land side pressure in the course of plowing, and thus aids in maintaining the plow in proper alignment.

It is believed that the operation of the device will be apparent from the above description. When it is necessary to plow over land which is sloping transversely to the direction of movement of the plow, or if for any other reason it is desired to vary the depth of the furrow being plowed, the furrow wheel 63 may be raised or lowered by means of the lever 85, the lever being secured in adjusted position by means of the dog 102 which is urged into engagement with the rack teeth by means of the spring 103. It will be readily apparent that the lever 85 acts through the link 81 and bell crank lever 75 upon the wheel so as to provide a compound leverage, and this makes possible the use of a longer axle portion 59, thus providing greater adjustability with less effort. Thus, by means of this arrangement, a furrow may be plowed varying from zero to ten (10) inches or greater.

Furthermore, the land side wheel may be adjusted in the same way by similar or other suitable means.

As a result of the connection of the axle 72 of the land side wheel with the bar 90 as shown at 92, it will be apparent that adjustment of the land side wheel in a manner similar to that of the furrow wheel just described will be transmitted to the furrow wheel through the bar 90, which will be moved horizontally as the result of the rotation of the axle 72, and through the link 81 and bell-crank lever 75 the wheel 63 will be accommodated to the adjustment of the land side wheel. It will be noted that the springs 115 and 115′, being in tension, will act so as resiliently to urge the wheels toward a depressed position.

Various modifications and improvements within the spirit of my invention will doubtless occur to those skilled in the art from the disclosure herein given, and hence I do not wish to be limited to the particular construction shown or uses mentioned except to the extent that my invention is defined in the appended claims, which are to be interpreted as broadly as is consistent with the state of the art.

I claim as my invention:

1. In a device of the class described, a plow comprising a frame, a share carried by said frame, a member secured to said frame for hitching said plow to a source of motivation, and means for angularly adjusting said hitching member with respect to said frame whereby said plow may be offset with respect to the line of travel of said source of motivation, said adjusting means comprising a bell crank lever pivotally secured to the inner end of said hitching member, a link connecting one arm of said bell crank lever to said frame, and means mounted on said hitching member and connected to the other arm of said bell crank lever for rotating the latter to various positions of angular adjustment.

2. In a device of the class described, a plow comprising a frame and a plurality of shares carried thereby, a hitching member pivoted to said frame, and means for adjusting said hitching member at various angles with respect to said frame for offsetting said plow with respect to the line of travel of a source of motivation, said adjusting means comprising a bell crank lever pivotally secured to the inner end of said hitching member, a link connecting one arm of said bell crank lever to said frame, and means mounted on said hitching member and connected to the other arm of said bell crank lever for rotating the latter to various positions of angular adjustment.

3. In a device of the class described, an agricultural implement comprising a frame member and a tool carried thereby, a member connected to said frame member for hitching said device to a source of motivation, and means for angularly adjusting said hitching member with respect to said frame member whereby said tool may be offset with respect to the line of travel of said source of motivation, said adjusting means comprising a bell crank lever pivoted to one of said members and means mounted on said hitching member for rotating said bell crank lever to various positions of angular adjustment.

4. In a device of the class described, an agricultural implement comprising a frame member and a tool carried thereby, a hitching member pivotally connected to said frame member, and means for adjusting said hitching member at various angles with respect to said frame member for offsetting said implement with respect to the line of travel of a source of motivation, said adjusting means comprising a bell crank lever pivoted adjacent its vertex to one of said members and having an arm laterally offset from said vertex and its other arm longitudinally extending toward the other of said members, said longitudinally extending arm having a movable connection with said other member, and means mounted on said hitching member and connected to said laterally offset arm for rotating said bell crank lever to various positions of angular adjustment.

JOSEPH E. BODA.